No. 647,114. Patented Apr. 10, 1900.
M. POTTER.
VEHICLE BRAKE BLOCK.
(Application filed Feb. 8, 1900.)
(No Model.)
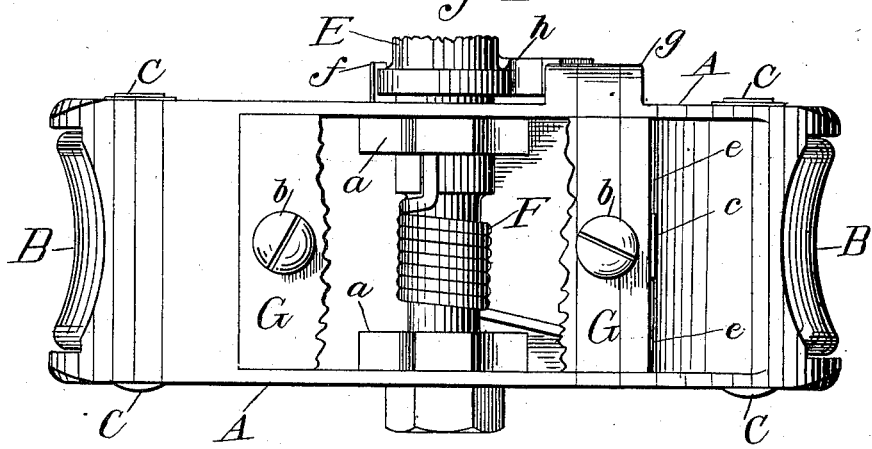
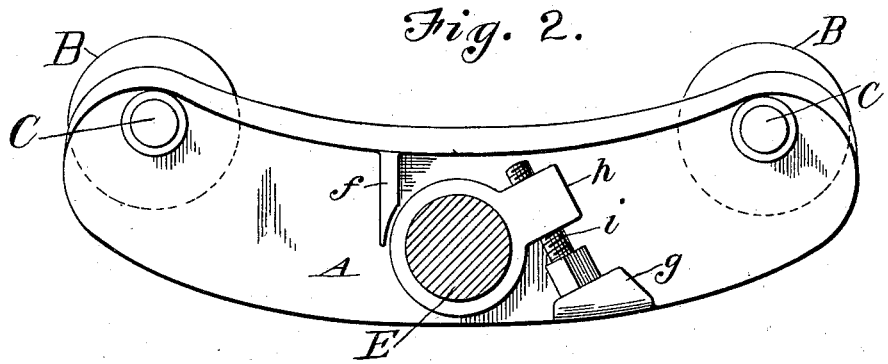
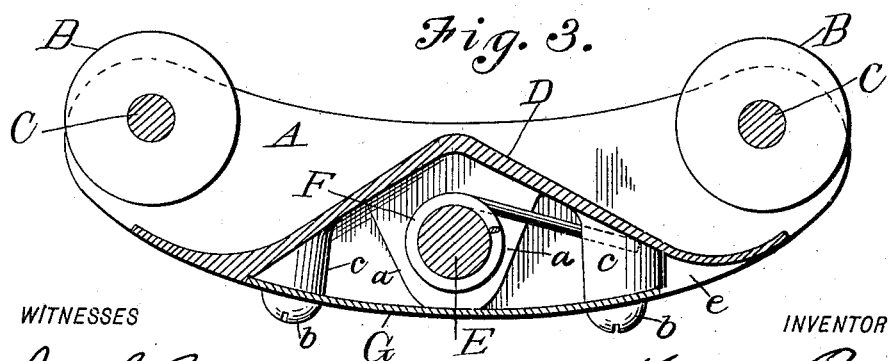
WITNESSES
INVENTOR
Morgan Potter,
BY
ATTORNEY

UNITED STATES PATENT OFFICE.

MORGAN POTTER, OF FISHKILL-ON-THE-HUDSON, NEW YORK.

VEHICLE BRAKE-BLOCK.

SPECIFICATION forming part of Letters Patent No. 647,114, dated April 10, 1900.

Application filed February 8, 1900. Serial No. 4,450. (No model.)

*To all whom it may concern:*

Be it known that I, MORGAN POTTER, a citizen of the United States, residing at Fishkill-on-the-Hudson, in the county of Dutchess and State of New York, have invented certain new and useful Improvements in Vehicle Brake-Blocks; and I do hereby declare the following to be a full, clear, and exact description of the invention, such as will enable others skilled in the art to which it appertains to make and use the same.

My invention relates to brake-blocks of the kind employed in brakes for wagons, carriages, and vehicles of any character, and especially to the variety employing rollers for bearing against the vehicle-tires instead of the more common brake-shoe, which is immovable with respect to the block.

The principal object of my invention is to provide or produce a brake-block of simple, compact, and durable form in which the rollers are axled in such manner as not to materially increase the thickness of the block, at the same time not interfering with the location and arrangement of the brake-shaft and spring and affording access to the interior of the block without disturbing the rollers; and a subordinate object is to provide a simple and efficient means for setting a block on its shaft, so that it shall always be capable of swinging thereon through a certain length of arc, but so that the commencement of the movement, as well as its ending, may be easily regulated. To accomplish all of this and to secure other and further advantages in the matters of construction, operation, and use, my improvements involve certain new and useful arrangements or combinations of parts and peculiar features of invention, all of which will be herein first fully described and then pointed out in the claims.

In the accompanying drawings, forming part of this specification, Figure 1 is a plan view showing the outer face or back of the brake-block, the removable back plate being broken away at its central part to expose the brake-block spring and the end of the brake-shaft within the block. Fig. 2 is an exterior side elevation upon a plane cutting the brake-shaft at right angles. Fig. 3 is a longitudinal central view, partly in section and partly in elevation.

In all the figures like letters of reference, wherever they occur, indicate corresponding parts.

A A are the two side walls of the brake-block, between which the rollers B B at either end are suitably axled or journaled, the axles C C being preferably in the form of rivets passing through the side walls and through the rollers, within which they may be bushed with brass or composition, if desired, to prevent the rollers from rusting on the axles and to insure a free revolution when they are brought to bear lightly against the tire. The rollers are suitably incurved at their central parts and rounded off at the ends to prevent them from damaging the tire and to automatically adjust themselves to their proper places on the tire as they are gradually brought to the holding position. The rollers may be made of metal or rubber, and in the latter case the bushings prevent undue wear.

The improved block with the rollers is chiefly advantageous for use in connection with rubber-tired vehicles, but may obviously be used to operate in connection with metal tires.

The side pieces A A are cast together or otherwise formed with the arched web D, the latter forming in part the back of the block and the inner face, being curved from the ends at the back to the central part of the inner face. The arch affords a strong and durable construction, closes the inner face of the block entirely, supplies a chamber within which the shaft projects and within which the block-spring is located, and it enables me to carry the roller-axles back, and thus to make the block of less thickness and therefore less cumbersome than in constructions requiring the rollers to be set in front of the inner face of the block.

E is the brake-shaft on which the block swings and by which the block is brought up to working position against the tire. As these improvements relate to the block, only a fragment of the shaft is shown. It may be mounted on the vehicle in any way. It projects through the block, which is supplied with enlargements, as at *a a*, to afford sufficient bearings for it, and the coiled spirng F engages with the shaft at one end and bears on the inside surface of the arch at the other to maintain the block in a yielding manner in respect to its shafts. A spring connection with the shaft is not new in brake-blocks; but heretofore the spring has been located in a chamber in the block accessible only from the shoe or bearing-face, requiring the block to be dismounted and the shoe removed before the spring could be reached. The back of the chamber formed by the arched web is furnished by a removable plate G, secured in place by screws, as b b, which enter lugs, as c c, cast in the block. This back plate G fits between the side pieces A and rests on lugs c, as well as on the enlargements a, so that it is amply well sustained from within and may be made thin and light. When the back plate is in place, the exterior of the block is comparatively smooth and uniformly curved. The plate G does not reach the web D at one end—that is, the end that is down when the block is in place for use—leaving an opening at e, through which the spring-chamber is constantly drained at the back of the block.

The block travels always with the shaft toward and from the wheel; but its motion on the shaft and under the influence of the spring is such that the lowermost roller will touch the tire first, the upper roller being brought in contact with the tire by further movement of the shaft, and when the shaft is retracted the upper part of the block is swung by the spring well out of the way of the tire. To limit the movement of the block on the shaft and to determine the point at which such movement shall commence, I supply the block with stationary lugs, as f and g, and the shaft E with a short arm or projection h, calculated to move between these stationary lugs. Heretofore I have located an adjusting-screw in a lug corresponding with the one at g, such screw being adjustable from the exterior. That plan was disadvantageous in that the screw was liable to move and was in the way of cleaning the block, always catching the chamois-skin or sponge, and it of necessity decreased the possible amount of swing of the block on its shaft by just as much as it regulated the position at which the swing could commence. Moreover, the screw was liable to be broken off or lost out of the lug.

By my present invention I locate an adjusting-screw i in a threaded opening through the arm h, said screw having a flat-faced head and being suitably fashioned to receive a wrench or other turning-tool. The flat-faced head bears against one of the lugs, and the other end of the screw is calculated to touch the other lug to prevent further swing. With this construction I obviate all the disadvantages above noted and, as will be apparent, do not decrease the length of arc through which it is possible for the block to swing, but leave it always of the same length, dependent on the length of the screw and not on the position to which the same may be adjusted. For instance, if screw i be turned in so that lug g rests nearer arm h than as shown in the drawings the arm h still has precisely the same distance to travel as before.

The flat-faced head of screw i, bearing against the flat face of lug g, cannot turn by accident, and therefore when once adjusted the screw remains in proper position until purposely turned.

The arrangement and location of the adjusting-screw are applicable upon other forms of brake-blocks and are intended to be used independently of other constructions herein described, if so desired.

The improved brake-block is simple, cheap, compact, and durable, and well calculated to answer all the purposes or objects of the invention hereinbefore alluded to.

Having now fully described my invention, what I claim as new herein, and desire to secure by Letters Patent, is—

1. In a brake-block of the character herein set forth, the side walls united by a web forming a chamber for the shaft and spring, said chamber being closed at front and open at back, and provided with a removable back plate, the parts being combined and arranged substantially as shown and described.

2. In a brake-block of the character herein set forth, the side walls united by a web forming a chamber for the shaft and spring, said side walls carrying the rollers axled therein as explained, and a removable back plate, the parts being combined and arranged substantially as shown and described.

3. In a brake-block of the character herein set forth, the combination with the side walls and web forming a chamber for the shaft and spring, of the removable back plate shortened to afford a drain-channel between its lower end and the back of the web, substantially as and for the purposes explained.

4. In a brake-block of the character herein set forth, the combination with the shaft, of an arm, an adjusting-screw and stop-lugs on the side of the block, said screw being mounted in and movable with the arm between the stop-lugs, substantially as shown and described.

5. In a brake-block of the character herein set forth, the combination with the shaft, of an arm, an adjusting-screw, and stop-lugs on the side of the block, said screw being mounted in the arm and supplied with a flat-faced head for bearing against one of the lugs, substantially as shown and described.

In testimony whereof I have affixed my signature in presence of two witnesses.

MORGAN POTTER.

Witnesses:
I. B. CAMMACK,
EDWIN E. STRONG.